(12) United States Patent
Cain

(10) Patent No.: US 8,390,869 B2
(45) Date of Patent: Mar. 5, 2013

(54) METHOD IMPLEMENTED IN PRINT SHOPS FOR SELECTING AND EXCHANGING JOB GROUPS BETWEEN APPLICATION PROGRAMS USING PORTABLE STORAGE DEVICES

(75) Inventor: Shane Matthew Cain, Carlsbad, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 548 days.

(21) Appl. No.: 12/748,994

(22) Filed: Mar. 29, 2010

(65) Prior Publication Data

US 2011/0235091 A1    Sep. 29, 2011

(51) Int. Cl.
*G06K 15/00* (2006.01)
*G06F 12/00* (2006.01)
*G06F 17/30* (2006.01)
*G06F 3/12* (2006.01)

(52) U.S. Cl. ...... 358/1.16; 358/1.15; 707/821; 707/822; 707/828; 711/115

(58) Field of Classification Search .............. 358/1.15, 358/1.16; 707/821, 822, 828; 711/115
See application file for complete search history.

(56) References Cited

U.S. PATENT DOCUMENTS

| 2006/0268310 A1* | 11/2006 | Tamai et al. | 358/1.14 |
| 2007/0043903 A1* | 2/2007 | Utsumi | 711/115 |
| 2007/0182986 A1* | 8/2007 | Ciriza et al. | 358/1.15 |
| 2010/0153643 A1* | 6/2010 | Kobayashi et al. | 711/115 |

* cited by examiner

*Primary Examiner* — Twyler Haskins
*Assistant Examiner* — Fred Guillermety
(74) *Attorney, Agent, or Firm* — Chen Yoshimura LLP

(57) ABSTRACT

A method for pre-configuring a portable storage device for use in transporting print jobs in a print shop, and a method for using the pre-configured portable storage device to export and import print jobs between different devices in the print shop. The portable storage device is pre-configured to contain multiple root directories uniquely corresponding to multiple print job management programs. A configuration file containing exporting and importing instructions and administrative information is stored in each root directory. When exporting print jobs, the exporting program automatically locates its own unique root directory and exports jobs into that root directory. When importing print jobs, once the operator indicates an exporting program, the importing program searches the root directory for the exporting program for all stored jobs and displays them to the operator for selection. The exporting and importing programs also automatically checks the configuration file in the appropriate root directory for instructions.

22 Claims, 6 Drawing Sheets

METHOD IMPLEMENTED IN PRINT SHOPS FOR SELECTING AND EXCHANGING JOB GROUPS BETWEEN APPLICATION PROGRAMS USING PORTABLE STORAGE DEVICES

This application is related to U.S. patent application Ser. No. 12/749,111, filed Mar. 29, 2010, entitled "Method implemented in print shops for selecting and exchanging job groups between application programs using portable storage devices".

BACKGROUND OF THE INVENTION

1. Field of the Invention

This invention relates to print job management system and method, and in particular, it relates to method for selecting and exchanging job groups between application programs in a print shop using portable storage devices.

2. Description of Related Art

In an environment where a large number of print jobs are processed with multiple printers, there has been a need to manage print jobs efficiently in an organized fashion. Examples of such an environment are professional print shops and print/copy departments at large organizations, where a variety of print requests, such as large-volume duplication and large document printing, needs to be processed and completed by utilizing multiple printers within a short turn-around time. These environments are collectively referred to as "print shops" in this application. Typically, each printing job specifies a source file that electrically contains a document to be printed, the size, color and the type of the paper on which the document should be printed, the printing resolution, duplex or single-side printing, and certain finishing conditions, such as book, staple, collate printing, etc., depending on a print job requester's needs.

In order to process a large volume of print jobs that each differ in terms of these job parameters, a print shop utilizes multiple commercial grade printers, including black & white and color printers. Each of these printers has limitations on available printer settings, such as the paper size, the paper type, resolution settings, etc. In addition, the print shop employs various finishing devices, such as collators, staplers, hole punchers, folding machines, binding machines, etc. A print shop management system (or print job management system) is typically implemented by software or firmware programs executed by a print shop management apparatus such as a control computer or server connected to the printers. The print shop management system submits each print job to one or more printers and finishing devices to produce the print job. The job submission may be done automatically by the print shop management system, semi-automatically with certain amount of operator intervention, or manually where decisions of how to submit the print jot to appropriate printers or finishing devices are made by an operator.

The print shop management system organizes and manages print jobs using database entries, typically referred to as "job tickets." A job ticket specifies values of various print job parameters, and associates itself to the source file(s). In one particular example, a job ticket may include a job ticket number, ticket name as well as the values of the following groups of various other job parameters: job information settings, basic settings (number of copies, orientation of paper, collate, offset printing, original paper size, output paper size, paper type, paper source, etc.), layout settings, cover sheet, finishing settings, inter-sheet settings, tab-paper settings, image quality settings, and customer information. A job ticket is associated with a source file (i.e. the document to be printed), and they collectively constitute a print job within the print shop management system.

Job tickets may be exported by the print shop management program so that the print jobs may be manipulated by other devices. Conventionally, exporting job tickets from the print shop management program involves selecting one job at a time and exporting that job as a compressed file containing the source file (document to be printed) and an associated job ticket file. In a conventional print job export method, the operator selects an "Export" option in a user interface (UI) of the print shop management program. The operator then manually chooses a destination folder (directory) location for the job ticket and the source file and exports the job ticket and source file to that location.

If this exported file is targeted for use by another software application, the file must be accessible for that application. However, the print shop environments may be such that various software applications are not located on the same network, located in the same room or building, or setup for simple job import from a networked drive or folder. In such cases, operators may employ USB (Universal Serial Bus) storage devices, memory cards, CD/DVD, or other portable storage devices to transfer the exported files. In a conventional method, the user manually selects the appropriate location (e.g. directory/folder) on the storage drive, and exports each compressed job, one at a time, to the storage device using the export capabilities provided by conventional print shop management software. The user then manually transports the storage device to the location of the target application. When importing the jobs from the storage device to the target application, the user traverses through the filesystem of the storage device and chooses each file (one at a time) to import to the target application.

SUMMARY

The present invention is directed to an improved method and related apparatus for exporting and importing print jobs that substantially obviates one or more of the problems due to limitations and disadvantages of the related art.

An object of the present invention is to provide a method, when using a portable storage device to transport exported print jobs, which allows a more automated way of selecting a storage location within the portable storage device for exporting and importing print jobs.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method, implemented in a print shop system which includes a plurality of print job management programs each controlling a corresponding one of a plurality of print job processing devices, for using a pre-configured portable storage device to transport print jobs between the print job management programs, the method including: (a) a first print job management program detecting the portable storage device connected to a first print job processing device controlled by the first print job management program, wherein the portable storage device is pre-configured to contain a plurality of root directories, each root directory uniquely corresponding to one of the print job management programs of the print shop; and (b) in response to a first command from an operator, wherein the first command indicates one or more print jobs to be exported without indicating any storage location on the portable storage device, the first print job management program storing the indicated print jobs in the portable storage device under a first root directory which corresponds to the first print job management program.

The method further includes: (c) a second print job management program detecting the portable storage device connected to a second print job processing device controlled by the second print job management program; (d) in response to a third command from an operator, wherein the third command indicates a selection of the first print job management program as an exporting program without indicating any storage location on the portable storage device, the second print job management program searching the first root directory on the portable storage device for stored print jobs, and displaying a list of print jobs found under the first root directory; and (e) in response to a fourth command from the operator which selects one or more print jobs from the displayed list, the second print job management program reading the selected print jobs from the portable storage device.

In another aspect, the present invention provides a computer program product comprising a computer usable non-transitory medium (e.g. memory or storage device) having a computer readable program code embedded therein for controlling print job processing devices, wherein the computer readable program code is configured to cause the print job processing devices to execute the above method.

In another aspect, the present invention provides a print shop system including: a first print job processing device having a memory storing a first print job management program and a processor executing the first print job management program; and a second print job processing device having a memory storing a second print job management program and a processor executing the second print job management program, wherein the first print job management program includes program code configured to cause the first print job processing device to execute a print job exporting process which includes: (a) detecting a portable storage device connected to the first print job processing device, wherein the portable storage device is pre-configured to contain a plurality of root directories, each root directory uniquely corresponding to one of the print job management programs of the print shop; and (b) in response to a first command from an operator, wherein the first command indicates one or more print jobs to be exported without indicating any storage location on the portable storage device, storing the indicated print jobs in the portable storage device under a first root directory which corresponds to the first print job management program.

Further, the second print job management program includes program code configured to cause the second print job processing device to execute a print job importing process which includes: (c) detecting the portable storage device connected to the second print job processing device; (d) in response to a third command from an operator, wherein the third command indicates a selection of the first print job management program as an exporting program without indicating any storage location on the portable storage device, searching the first root directory on the portable storage device for stored print jobs, and displaying a list of print jobs found under the first root directory; and (e) in response to a fourth command from the operator which selects one or more print jobs from the displayed list, reading the selected print jobs from the portable storage device.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 7:
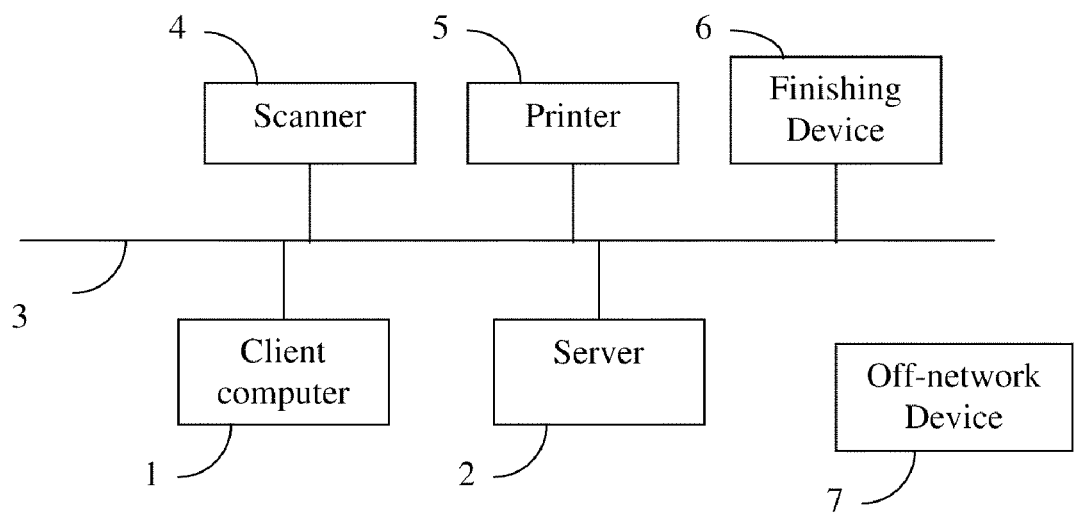
FIG. 7 schematically illustrates a print shop system where embodiments of the present invention may be implemented.

FIG. 7 schematically illustrates an exemplary print shop system having multiple printers, finishing device and other devices, where embodiments of the present invention may be implemented. In the print shop system, one or more client computers 1 are connected to a server 2 via a local area network (LAN) 3 or other suitable network. Remote clients may be connected to the server 2 via an open network such as the Internet. Scanners 4, printers 5, finishing devices 6 are also connected to server 2 via the LAN. In this example, printers 5 are commercial standard high-end printers that can handle high speed, high quality printing. Each printer has multiple paper trays to store paper of various sizes, color, and types. Further, some of the printers are equipped with a sophisticated output sorting mechanism with multiple output trays to perform collate printing or other print finishing functions. Each printer has one or more display monitors to display the status of the printing and various warning and instruction messages to a user. Each printer is equipped with its own central processing unit (CPU) and appropriate hardware/software to control its own printing operations, and communicates with server 2 via the LAN. Some of these printers may also be multifunction printers that can perform copying and scanning of documents.

In addition, the print shop system shown in FIG. 7 includes a number of devices 7 that are not connected to the network 3. The off-network devices may be any type of devices used in the print shop, such as finishing devices, prepress devices, etc.

Print job management software (or print shop management software) is installed on server 2 for managing a large number of print jobs that come into the print shop. As described earlier, the print job management software organizes and manages print jobs using job tickets. A main function of the print job management software is to analyze the job ticket requirements and submit each job to one or more printers and/or finishing devices to produce the print job.

The print job management software program may be stored in either of a read only memory (ROM) or a hard disk drive (HDD), which can be accessed by the CPU of the server 2. Once a print shop operator calls the print job management software, server 2 reads out the print job management software from the ROM or HDD to a random access memory (RAM) of the server to carry out various functions of the software, including management of print jobs. The print job management software preferably is designed to run on Windows OS, Macintosh OS, or Unix X Windows or other computer operating systems implementing a GUI (graphic user interface), such as a touchscreen and/or a mouse and a keyboard, coupled with a display monitor. Server 2 (or any suitable data processing apparatus) running print job management software of embodiments of the present invention is hereinafter referred to as "print job management server." In this application, the terms "print job management server" and "print job management apparatus" broadly refer to any data processing apparatus that can implement various features of embodiments of the present invention described below with appropriate hardware/software.

While FIG. 7 shows a print shop environment, the invention is not limited to any physical setting of a shop or network, and can be applied to a print shop system having a distributed setting where printers at different locations are connected to a server. In particular, it should be apparent that one or more of the components of the print shop system can communicate with the rest of the system via virtual private network (VPN) or similar means through the Internet.

In the context of this disclosure, each of the devices in the print shop (e.g., items 1-2 and 4-7 of FIG. 7) is generally referred to as a "print job processing device," and each of them performs some aspects of print job processing such as job intake, routing, prepress, printing, finishing, etc. Various print job processing devices are controlled by various print job management programs, which reside in memories and are executed by processors of the print job processing devices. Each print job management program has a print job database to store print jobs it processes. Exporting and importing of print jobs refers to moving print jobs from one print job management program to another. In one particular example, a number of print jobs are printed by a printer but without all finishing steps completed, and an operator exports the jobs from the printer's program to a finishing device (controlled by its own program) in order to complete the print job.

Embodiments of the present invention improve a print shop management system's ability to conveniently export and import print jobs by providing two measures. First, they provide an automated method of exporting and importing multiple (i.e. groups of) print jobs, where the grouping of the jobs is defined by desired criteria. More generally, the embodiments provide filtering of print jobs based on desired criteria, and exporting them for purpose of desired processing.

Second, embodiments of the present invention provide a method by which a portable storage device is pre-configured for storing print jobs exported from specific programs. The jobs stored on such storage devices can then be automatically imported to a target program (the importing program) by inserting the storage device into the target computer and selecting an option to import the job group into the target program. The portable storage devices useful in implementing the present invention include USB flash drives, memory cards, CD/DVD, or other suitable storage devices.

Figure 1:
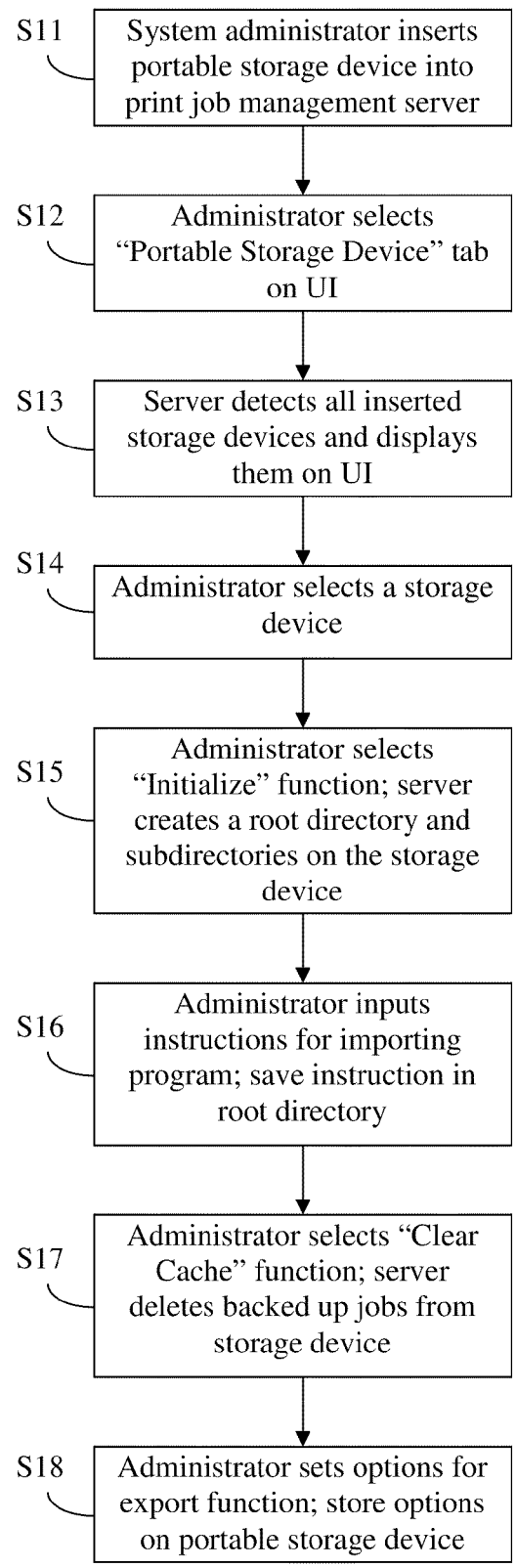
FIG. 1 illustrates a process implemented by a print job management program for pre-configuring a portable storage device for transporting exported print jobs according to an embodiment of the present invention.
Figure 2:
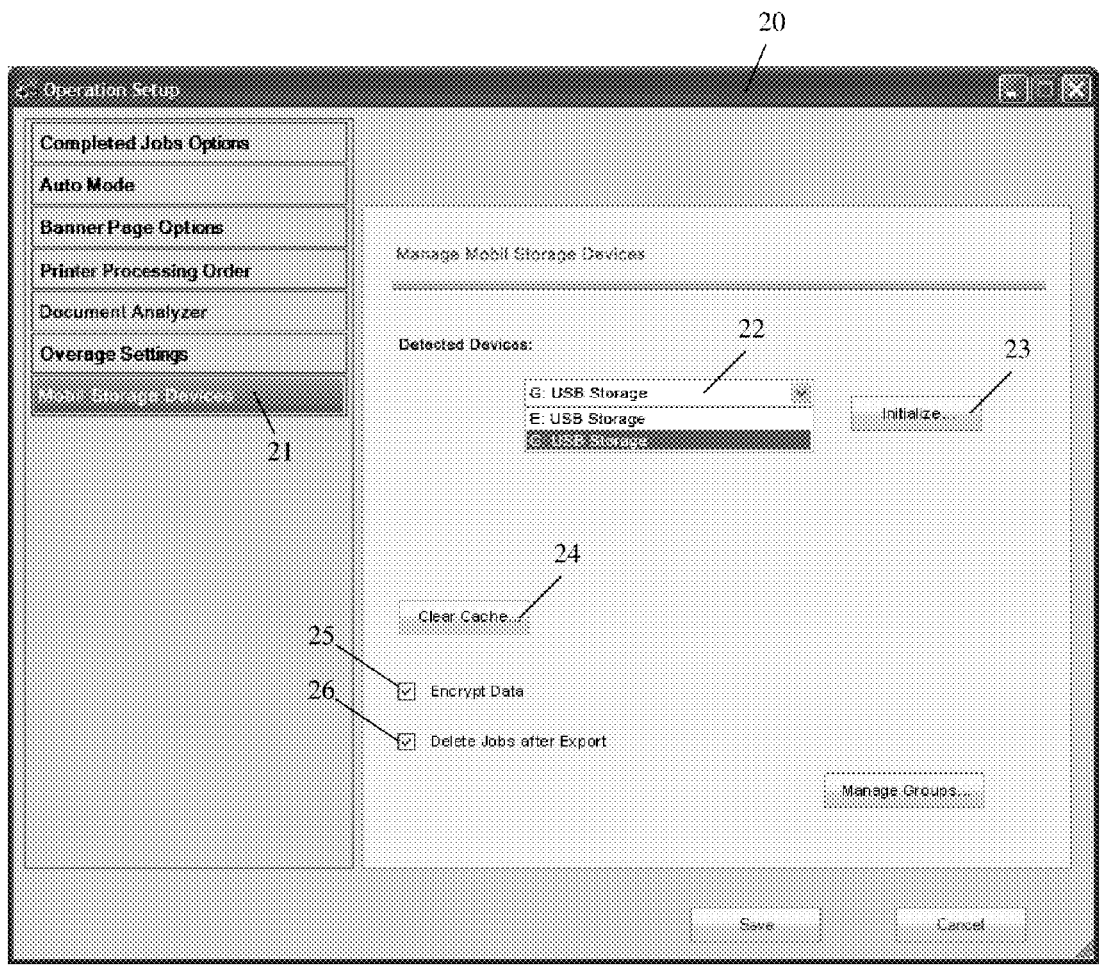
FIG. 2 shows an Operation Setup user interface (UI) of the print job management program according to an embodiment of the present invention.

FIG. 1 illustrates a process implemented by a print job management program for pre-configuring (i.e. initializing) a portable storage device for transporting exported print jobs. FIG. 2 shows an "Operation Setup" user interface (UI) 20 of the print job management program that may be used to accomplish this procedure. The pre-configuration process sets up various directories on the storage device, and sets various options for later export and/or import operations performed with the storage device. This procedure is typically performed by a system administrator, and the pre-configured device can then be used by operators without having to configure it again.

As shown in FIG. 1, the system administrator inserts the storage device into an appropriate peripheral port or connector of the print job management server (step S11). On the UI 20, a tab 21 (or other type of input means) is displayed to allow the administrator to selects a function of managing portable storage devices. Once the administrator selects the "manage portable storage devices" function from the UI 20 (step S12), the UI displays all detected portable storage devices connected to the server (e.g. in a window 22) (step S13), and allows the administrator to select one of these storage devices (step S14). The program also displays various tabs, buttons, drop-down menus, checkboxes and/or other types of input means in UI 20 to allow the administrator to select one or more of the following control functions or options for the selected storage device.

Initializing the portable storage device: If the administrator selects the "Initialize" function (button 23), the program automatically creates a root directory on the storage device, and creates a subdirectory (e.g., a subdirectory named .jobs) for storing any jobs or job groups exported by the program (step S15). The root directory preferably has a directory name unique to the program that created it. Note that different print job management programs, or different modules of a suite of print job management programs, may create root directories unique to the respective programs. Various suitable mechanisms may be used to mark and identify each program's root directory. It should be noted that the root directories described here are not necessarily the highest level directories of the filesystem of the portable storage device.

After creating the directories, the UI displays a popup dialog box for the administrator to input and save desired instructions for use by the importing programs that will be importing the jobs (step S16). These instructions are saved in a configuration file in the root directory. One example is a backup instruction regarding automatic backup options after print jobs are imported into the importing program. For example, the backup instruction may instruct the importing program to mark each stored job or job group as a backup (for example, the job group's directory may be renamed to have name extension ".BAK"). The jobs or job groups are not deleted. Alternatively, the backup instruction may instruct the importing program to delete the jobs or job groups from the storage device after importing.

Clearing the cache: If the administrator selects the "Clear Cache" function (button 24), the program displays a dialog box or other type of input means to allow the administrator to selectively delete backed up jobs or job groups stored on the storage device (which have already been imported to another program), or to delete all currently stored backed up jobs or job groups (step S17).

The UI 20 also allows the administrator to set various instructions for the export operation (step S18). For example, if the administrator selects the "Encrypt Data" option (checkbox 25), the program will encrypt all exported data. Any suitable encryption algorithms may be used for this purpose. If the administrator selects the "Delete Jobs after Export"

option (checkbox 26), the program will delete the jobs from the program's job database once the jobs are exported to the portable storage device.

These export and import options are a part of the configuration settings of the particular portable storage device being pre-configured, and are stores on the storage device itself. For example, these options (settings), as well as other administrative information, may be stored in a configuration file within the unique root directory created by this program. When the storage device is later used to export and import jobs, the exporting program and the importing program will look for the configuration file in the appropriate root directory, and carry out the exporting and importing steps according to the configuration settings in the configuration file.

Other desirable functions and options may be provided via the UI 20.

The pre-configuration function may be implemented in any print shop management program, and each program will create a unique root directory on the portable storage device for storing jobs exported by that program, as well as a configuration file stored in the unique root direction.

After the storage device is pre-configured, an operator can use it to export and import print jobs.

Figure 3:
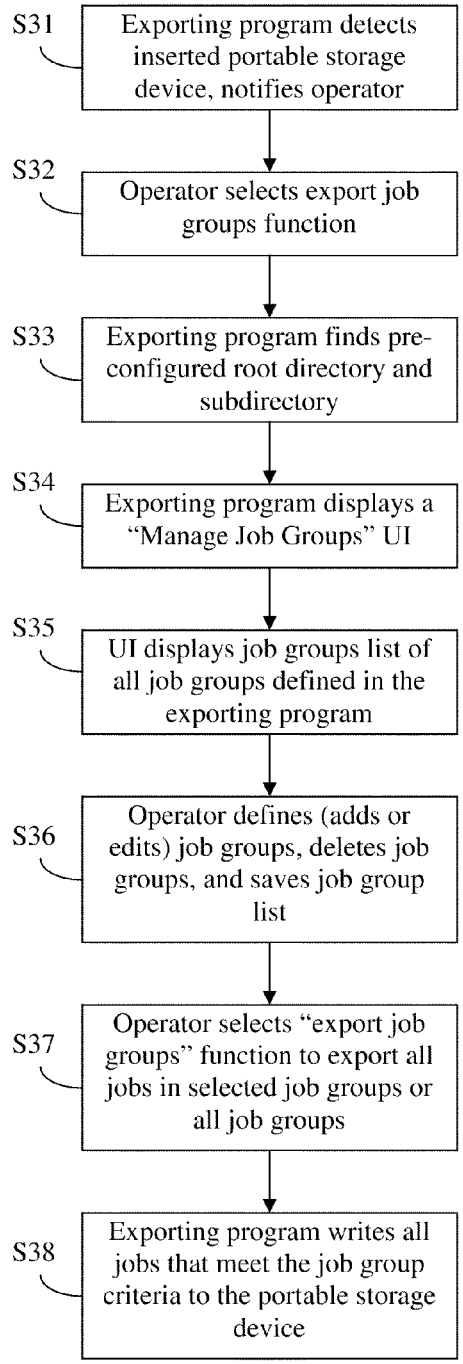
FIG. 3 illustrates a process implemented by a print job management program to export print jobs to a portable storage device according to an embodiment of the present invention.

FIG. 3 illustrates a process implemented by a print job management program to export print jobs to a portable storage device in an automated manner. First, the program detects any portable storage devices that are newly inserted into the server; when a new storage device is detected, the program displays a message (e.g. via popup window, not shown) to notify the operator (step S31). Preferably, the program has an internal thread running that automatically performs step S31. The operator then selects an "export job groups" function (e.g. by using a drop-down menu tree of a main UI of the program, not shown) (step S32). The program attempts to traverse the directories on the storage device to locate the unique root directory for the program and the subdirectory where all exported jobs from that program are to be stored (step S33). In one implementation, if the program detects a storage device but does not find the proper root directory, an error message is displayed requesting the operator to have an administrator initialize the storage device. An UI of the program (e.g. FIG. 2) displays the name of the currently detected portable storage device.

Figure 4:
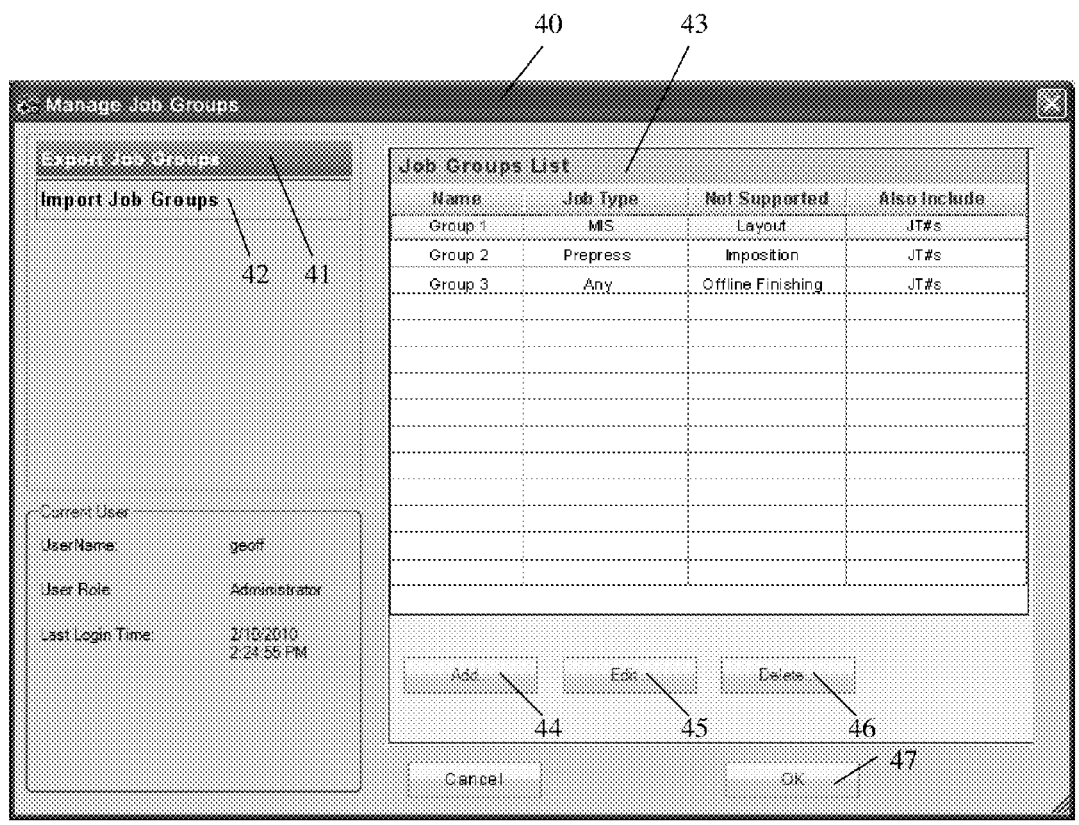
FIG. 4 shows a Manage Job Groups UI of the print job management program according to an embodiment of the present invention.

Once the exporting program successfully detects the portable storage device and the proper directories, it may automatically display a "Manage Job Groups" UI 40, as shown in FIG. 4 (step S34). Alternatively, the operator may bring up this UI 40 by selecting a "manage job groups" function from within the exporting program. In this example, the UI 40 can be used to manage job groups for both exporting and importing purposes (described later), and two tabs 41 and 42 are provided for selecting these two purposes. When the "export job group" tab 41 is selected, the UI 40 displays a job groups list 43, which is a list of all job groups defined in the exporting program (step S35). A job group is a group of print jobs that meet certain defined criteria. For example, a job group may be defined as all pending jobs that require a particular finishing operation. A job group is created by defining the criteria for the group. Initially, the job group list 43 may be empty; the UI 40 provides various buttons to allow the operator to add, edit or delete job groups.

Figure 5:
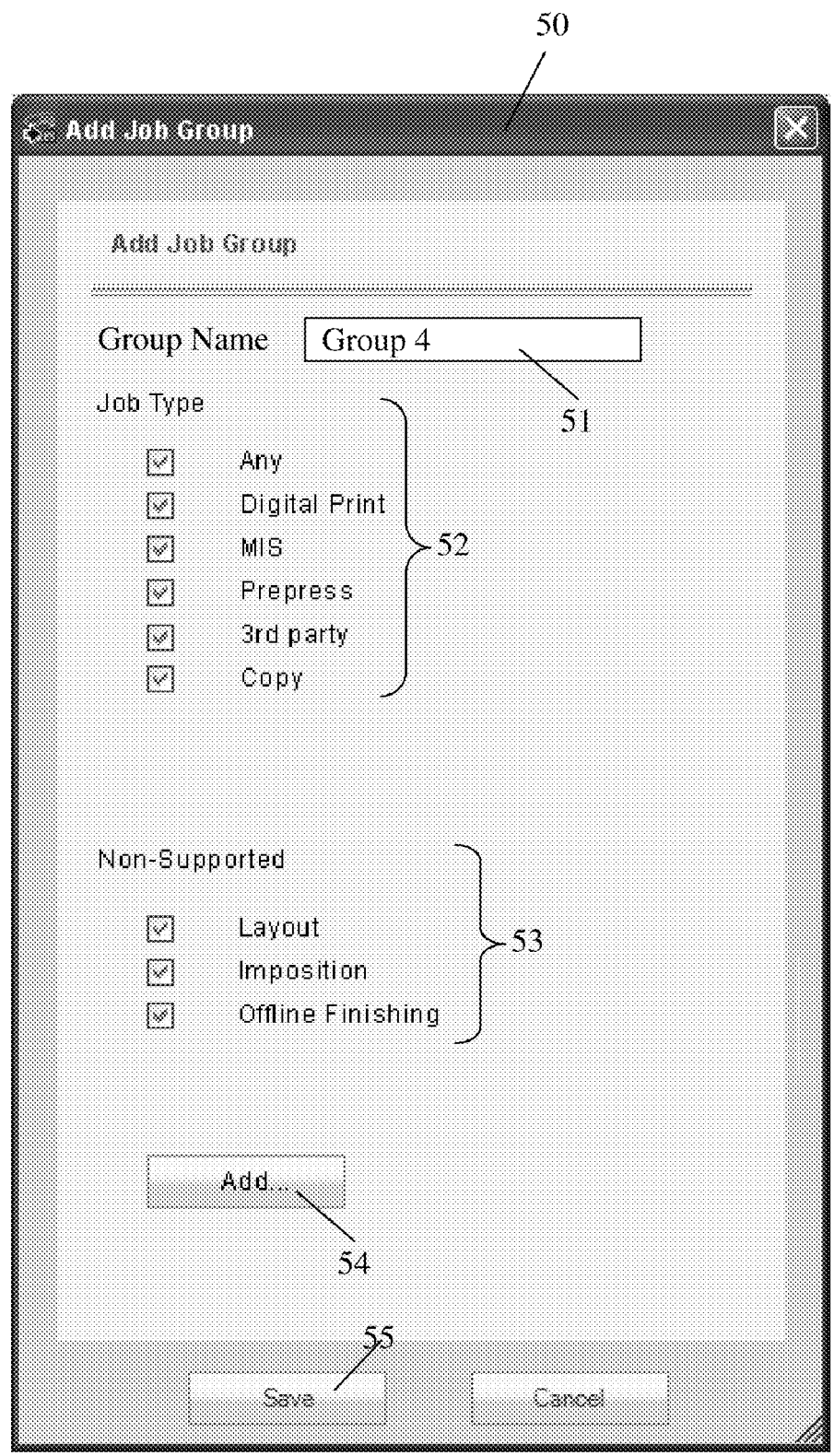
FIG. 5 shows a Job Group UI for adding or editing a job group according to an embodiment of the present invention.

For example, when the operator selects the "Add" button 44 in the UI 40, a job group dialog box 50 or other type of UI window (see FIG. 5) is displayed for adding a job group. The dialog box 50 has an input field 51 for the operator to input a name for the job group. The dialog box allows the operator to specify the criteria for the job group. For example, the dialog box 50 displays a number of checkboxes 52 for the operator to specify the job type. The operator may select one or more job types, such as "any" (i.e. job type not specified), "Digital Print" (jobs to be exported to a printer), "MIS" (jobs to be exported to a management information system, which performs functions such as intake of jobs, administrative tasks, etc), "Prepress" (jobs to be exported to a prepress device, which manipulates layout, etc.), "3rd party" (jobs to be exported to a third part proprietary system), "Copy" (jobs to be exported for copy operation), etc.

The dialog box 50 further displays a number of checkboxes 53 for the operator to specify jobs that have non-supported (unexecuted) job requirements as job group criteria. As described earlier, a conventional print job management program analyzes the job ticket requirements of each print job and submits each job to one or more printers, finishing devices and/or other devices on the network 3 to produce the print job. Sometimes, the printers and other devices available on the network 3 are unable to support all job ticket requirements for some jobs. Thus, after the print job management program submits the jobs to the appropriate devices on the network 3, there may still be job ticket requirements that are non-supported and therefore unexecuted, such as specific finishing operations, etc. The "Non-Supported" checkboxes 53 allows the operator to specify certain non-supported job ticket requirements as a part of the definition of a job group. For example, if the operator checks the "Page Layout" checkbox, the job group will include all pending jobs that have unexecuted, non-supported requirements for layout. Similarly, if the "Imposition" or "Offline Finishing" checkbox is selected, the job group will include all pending jobs that have unexecuted, non-supported requirements for imposition or offline finishing functions.

Note that the "Non-Supported" checkboxes 53 are provided only for print job management programs that perform a function of submitting print jobs to printers and other devices. Programs that do not perform the job submission functions will not need to specify these options.

The dialog box 50 also includes an "Add" button 54 to allow the operator to manually include particular jobs to this job group. When the "Add" button 54 is selected, a popup dialog (not shown) displays a list of all pending jobs (i.e. jobs that have not been completed), so that the operator can select individual jobs for inclusion in this job group. In other words, the job ticket numbers of the selected individual jobs are now a part of the criteria for this job group.

After the operator specified the criteria for the current job group, the operator saves the current job group using a "Save" button 55 of the dialog box 50.

Referring back to FIG. 4, the "Manage Job Groups" UI 40 also includes an "Edit" button 45 to allow the operator to edit the criteria of an existing job group. Clicking the edit button 45 will bring up a job group dialog box similar to that shown in FIG. 5, which allows the operator to edit the criteria of a selected job group. Further, a "Delete" button 46 of the UI 40 allows the operator to delete a selected job group. In FIG. 3, the step of defining (adding or editing) or deleting a job group is generally represented as step S36.

The current job group list may be saved in the exporting program by clicking an OK button 47 of the UI 40. The saved job group list can be later used when the operator executes job export.

Preferably, only pending print jobs, i.e., jobs that have not yet completed production, will be included in the job groups defined in this procedure, because the main purpose of defining the job groups is to facilitate exporting of jobs to other devices to complete the job production, and there is typically no need to export an already completed job.

Once the job groups are defined, the operator can use them to export multiple print jobs conveniently. For example, to export print jobs in all currently defined job groups to the portable storage device, the operator selects an "export job groups" function from within the exporting program (e.g. using a drop-down menu tree of a main UI of the exporting program, not shown) (step S37). Once the operator selects the "export job groups" function, the exporting program automatically exports (writes) all print jobs in all currently listed job groups to the portable storage device (step S38). As a part of the exporting step, the exporting program filters the print jobs in the exporting program's jobs database to find all jobs satisfying the criteria of each job group.

Note that the operator does not need to indicate a storage location for storing the exported jobs; the exporting program automatically stores them under the unique root directory for the exporting program and appropriate sub-directories. The exported jobs are stored in the portable storage device as groups, for example, by using sub-directories. Preferably, the job group criteria such as job type, non-supported settings, etc., are also stored on the portable storage device in association with the job groups, so that they may be referenced by the importing program. Preferable, the exporting program displays a popup message to advise the operator whether the export operation was successful.

Although not shown in FIG. 4, the UI 40 may provide an appropriate input means (such as a checkbox next to each group's name) to allow the operator to select one or more of the listed job groups, and to execute the export function to export all jobs in the selected job groups.

As mentioned earlier, the portable storage device may store export options created during the pre-configuration process. In step S38, the exporting program performs the exporting operation by referring these export options.

It should be noted that the operator may also manually export jobs using the conventional job export method (one job at a time) to the storage device.

Figure 6:
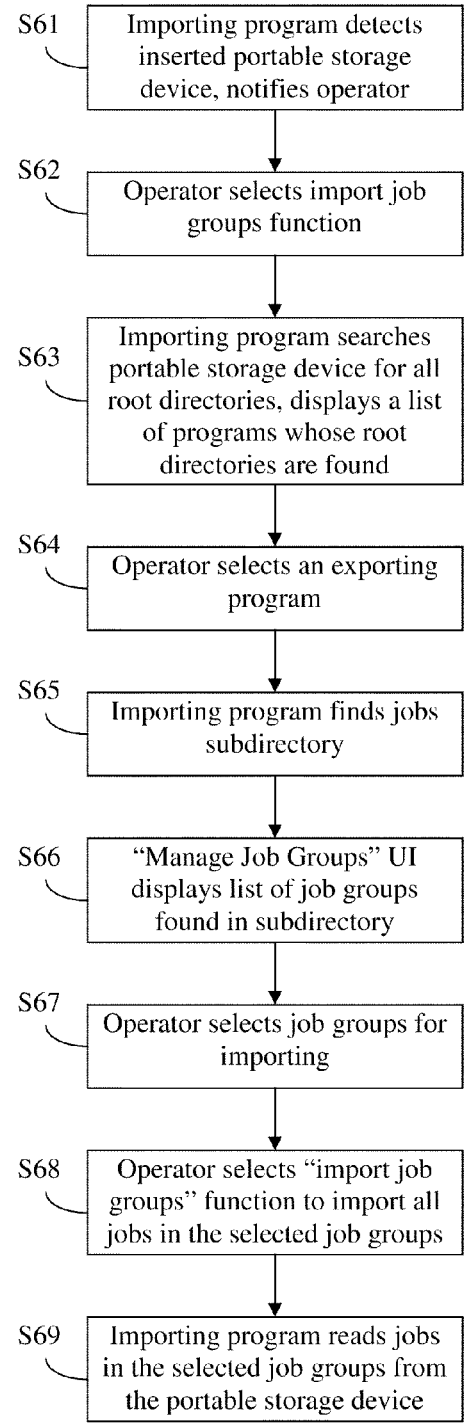
FIG. 6 illustrates a process implemented by a print job management program to import print jobs from a portable storage device according to an embodiment of the present invention.

To import print jobs stored in a portable storage device to another print job management program, the operator manually transports the storage device to another computer where the other program (the importing program) is running, and inserts the storage device into the computer. FIG. 6 illustrates a process implemented by the importing program to import print jobs from a portable storage device in an automated manner.

First, the importing program detects any portable storage devices that are newly inserted into the computer; when a new storage device is detected, the program displays a message (e.g. via popup window, not shown) to notify the operator (step S61). Preferably, the program has an internal thread running that automatically performs step S61. The operator then selects an "import job groups" function (e.g. by using a drop-down menu tree of a main UI of the program, not shown) (step S62). The program searches the portable storage device for all unique root directories for exporting programs, and displays a list of programs whose root directories are found on the storage device (UI is not shown) (step S63). The operator selects one of the exporting programs (step S64), and the program finds the subdirectory in the appropriate root directory where all jobs exported by the selected exporting program are stored (step S65).

Once the importing program successfully finds the appropriate subdirectory on the storage device, it may automatically display the "Manage Job Groups" UI 40, as shown in FIG. 4 (step S66). Alternatively, the operator may bring up this UI 40 by selecting a "manage job groups" function from within the exporting program. As mentioned earlier, the "Manage Job Groups" UI 40 can be used to manage job groups for both exporting and importing purposes. For importing purpose, the operator selects the "import job group" tab 42. In response, the UI 40 displays a list of job groups found in the subdirectory which are available for importing (step S66). Preferably, the job group criteria for each job group, such as job type and non-supported settings, are also read from the storage device and displayed in the job group listing.

Note that if the portable storage device stores exported job groups from more than one program in their respective root directories and subdirectories, all available job groups from all exporting programs will be displayed. In addition, if other print jobs are found outside of the root directory structures, they may be listed as a group called "Other" when displayed in the UI 40. These jobs may have been be exported by, for example, print job management programs that do not implement the automatic group exporting functions described earlier.

Note that FIG. 4 shows the appearance of UI 40 when the "Export Job Groups" tab 41 is selected; its appearance when the "Import Job Groups" tab 42 is selected is not shown, but may be similar to that shown in FIG. 4. In this example, the same UI window 40 is used for both importing and exporting purposes. Alternatively, two separate UI windows may be used, one providing job group management for exporting purpose, the other providing job group management for importing purposes.

From the list of available job groups in the "Manage Job Groups" UI 40, the operator selects which groups are to be imported into the importing program (step S67). The operator then selects an "import job groups" function from within the importing program (e.g. using a drop-down menu tree of a main UI of the importing program, not shown) (step S68). Once the operator selects the "import job groups" function, the importing program automatically imports (reads) all print jobs in the selected job groups from the portable storage device into the importing program (step S69). The imported jobs are stored in the importing computer's jobs database as new jobs. Preferable, the importing program displays a popup message to advise the operator whether the import operation was successful. The imported jobs can now be processed by the importing program. For example, if the importing program is on a finishing device, the finishing operation can now be carried out on the imported jobs.

After importing the jobs, the importing program may perform other functions, such as backup functions, as instructed by the instructions stored in the portable storage device by the exporting program. More specifically, the importing program searches the relevant root directory to identify the configuration file, reads the instructions contained therein, and executes the backup and other functions based on the instructions.

To import additional jobs, steps S64 to S69 or S62 to S69 may be repeated.

To summarize, embodiments of the present invention implement two main features to provide more convenient print job exporting and importing operations, namely, pre-configuration of portable storage devices for storing exported jobs, and grouping of print jobs for purposes of exporting/importing of multiple jobs. These features enable an operator to simply insert a portable storage device into a computer or device, and use an UI to conveniently achieve export and import of multiple print jobs. This makes is convenient for the operator to move print jots between computers or programs that are not located on the same network.

The grouping function described here is based on stages of workflow within the print shop. Typically, a print job may go through several stages including MIS origination (Management Information System, which receives, manipulates, and routes jobs), prepress, printing, and finishing. Within some of the stages, conventional print job management program have provided a grouping function. For example, in the printing stage, the conventional print job management program allows the user to define job groups for purposes of submitting jobs to printers. The grouping function described in this disclosure is not for managing jobs with a stage of workflow, but for moving jobs between different stages of workflow. For example, the job type setting of the group criteria (see FIG. 5, item 52) allows the operator to specify jobs for a specific workflow stage for exporting (each job type may correspond to a stage of workflow).

Although the above two features are related to each other in that they cooperate with each other to facilitate convenient job export/import, they may be implemented separately. In other words, the pre-configuration of portable storage devices may be implemented even if jobs are not grouped for export/import, e.g., even if the operator has to select jobs individually for export/import. Conversely, the job grouping function may be implemented to export/import jobs using a portable storage device even if the storage device is not pre-configured. When both features are implemented, the two features cooperate with each other to further enhance the advantages.

The print job export/import methods provided by embodiments of the present invention have many advantages. They allow organization of print jobs into "groups" for device storage and retrieval, where the organization can be based on user criteria. Multiple print jobs can be exported and import conveniently; the operator does not have to select the jobs one at a time for purposes of exporting jobs. Operators can create job groups based on multiple criteria. For example, the operator can filter out "problem jobs" with non-supported job ticket settings; these jobs can be batch exported to an appropriate application for execution.

Pre-configuration of portable storage device means that the operator does not have to manually locate the directories on the storage device to find the directory to store jobs or to find stored jobs. This avoids accidentally overwriting directories/files already on the device or misplacing exported jobs into the wrong filesystem locations, and removes the requirement for print shop operators to understand exported file formats and directory structures. It allows the importing program to recognize the origin of job groups (i.e. the name of the exporting program). It also allows future file format and directory structure updates to be carried out by experienced administrators without affecting normal operators. Further, it allows mechanism for the importing program to automatically decide which files on a device are for import, and also provides options for backing up stored jobs for later use or emergency recovery.

The embodiments may be implemented in the print job management programs (software), without requiring special proprietary hardware or firmware.

Although examples of the user interface displays used in the various procedures are shown and described in detail here (e.g. FIGS. 2, 4, 5), the invention is not limited to the specifics of the user interface displays. The invention may be implemented using any forms of user interface displays, as long as the user interface display includes display means and input means that allow the user to specify various settings and issue commands to the programs. The input means may be buttons, check boxes, radio buttons, text input fields, drop-down menus, pop-up menus, icons, tabs for bringing up different sheets, separate windows, etc., or combinations thereof, or any other suitable structure of allowing the user to input information to the computer. The computer software designs for suitable structures of the input means are apparent and familiar to a person of ordinary skill in this field. Therefore, detailed descriptions for these structures are omitted from here. The term "user interface display" is used to generally mean any suitable screen display that displays information to the user and/or allows the user to input commands and other information, and is not limited to any specific form of display, and may include a series of consecutive displays.

It will be apparent to those skilled in the art that various modification and variations can be made in the print job group exporting and importing method and related apparatus of the present invention without departing from the spirit or scope of the invention. Thus, it is intended that the present invention cover modifications and variations that come within the scope of the appended claims and their equivalents.

What is claimed is:

1. A method, implemented in a print shop system which includes a plurality of print job management programs each controlling a corresponding one of a plurality of print job processing devices, for using a pre-configured portable storage device to transport print jobs between the print job management programs, the method comprising:
   (a) a first print job management program detecting the portable storage device connected to a first print job processing device controlled by the first print job management program, wherein the portable storage device is pre-configured to contain a plurality of root directories, each root directory uniquely corresponding to one of the print job management programs of the print shop; and
   (b) in response to a first command from an operator, wherein the first command indicates one or more print jobs to be exported without indicating any storage location on the portable storage device, the first print job management program storing the indicated print jobs in the portable storage device under a first root directory which corresponds to the first print job management program.

2. The method of claim 1, further comprising, after step (a) and before step (b):
   the first print job management program notifying the operator of the detection of the portable storage device;
   in response to a second command from the operator, the first print job management program displaying a user interface and receiving, via the user interface, input from the operator specifying a plurality of job group criteria which define one or more job groups; and
   the first print job management program receiving the first command, wherein the first command instructs the first print job management program to export print jobs that satisfy the job group criteria for each defined job group.

3. The method of claim 2, wherein in step (b) the print jobs that satisfy the criteria of each job group are stored as an exported print job group, and wherein step (b) further includes storing the criteria for each exported print job group in the storage device under the first root directory.

4. The method of claim 1, wherein the portable storage device further contains a configuration file under each root directory, the configuration file containing export instructions, and wherein the first print job management program reads the configuration file in the first root directory and performs one or more actions as instructed by the export instructions in the configuration file.

5. The method of claim 4, wherein the export instructions include one or more of a data encryption instruction to encrypt the print jobs before storing them in the portable storage device, and a delete instruction to delete the print jobs from the first print job management program after storing them in the portable storage device.

6. The method of claim 1, further comprising:
(c) a second print job management program detecting the portable storage device connected to a second print job processing device controlled by the second print job management program;
(d) in response to a third command from an operator, wherein the third command indicates a selection of the first print job management program as an exporting program without indicating any storage location on the portable storage device, the second print job management program searching the first root directory on the portable storage device for stored print jobs, and displaying a list of print jobs found under the first root directory; and
(e) in response to a fourth command from the operator which selects one or more print jobs from the displayed list, the second print job management program reading the selected print jobs from the portable storage device.

7. The method of claim 6, further comprising, after step (c) and before step (d):
the second print job management program notifying the operator of the detection of the portable storage device; and
in response to a fifth command from the operator, the second print job management program searching the portable storage device for all root directories corresponding to any print job management program of the print shop, and displaying a list of print job management programs whose root directories are found,
wherein in step (d) the third command is a selection from the displayed list of print job management programs.

8. The method of claim 7, wherein the print jobs are stored as exported print job groups under the first root directory, each print job group including print jobs that satisfy a plurality of criteria, wherein the criteria for each group is stored under the first root directory, and
wherein step (d) includes displaying a list of all print job groups found under the first root directory along with the criteria for the print job groups.

9. The method of claim 6, wherein the portable storage device further contains a configuration file under each root directory, the configuration file containing import instructions, and wherein the second print job management program reads the configuration file in the first root directory and performs one or more actions as instructed by the import instructions in the configuration file.

10. The method of claim 9, wherein the import instructions include a backup instruction regarding automatic backup options after print jobs are imported.

11. The method of claim 1, further comprising, before step (a):
the first print job management program creating the first root directory and storing a configuration file in the first root directory, the configuration file containing export instructions to be executed by the first print job management program when exporting print jobs, and import instructions to be executed by any print job management program when importing print jobs from to the first root directory.

12. A print shop system including:
a first print job processing device having a memory storing a first print job management program and a processor executing the first print job management program; and
a second print job processing device having a memory storing a second print job management program and a processor executing the second print job management program,
wherein the first print job management program includes program code configured to cause the first print job processing device to execute a print job exporting process which includes:
(a) detecting a portable storage device connected to the first print job processing device, wherein the portable storage device is pre-configured to contain a plurality of root directories, each root directory uniquely corresponding to one of the print job management programs of the print shop; and
(b) in response to a first command from an operator, wherein the first command indicates one or more print jobs to be exported without indicating any storage location on the portable storage device, storing the indicated print jobs in the portable storage device under a first root directory which corresponds to the first print job management program.

13. The print shop system of claim 12, wherein the print job exporting process further includes, after step (a) and before step (b):
notifying the operator of the detection of the portable storage device;
in response to a second command from the operator, displaying a user interface and receiving, via the user interface, input from the operator specifying a plurality of job group criteria which define one or more job groups; and
receiving the first command, wherein the first command instructs the first print job management program to export print jobs that satisfy the job group criteria for each defined job group.

14. The print shop system of claim 13, wherein in step (b) the print jobs that satisfy the criteria of each job group are stored as an exported print job group, and wherein step (b) further includes storing the criteria for each exported print job group in the storage device under the first root directory.

15. The print shop system of claim 12, wherein the portable storage device further contains a configuration file under each root directory, the configuration file containing export instructions, and wherein the first print job management program reads the configuration file in the first root directory and performs one or more actions as instructed by the export instructions in the configuration file.

16. The print shop system of claim 15, wherein the export instructions include one or more of a data encryption instruction to encrypt the print jobs before storing them in the portable storage device, and a delete instruction to delete the print jobs from the first print job management program after storing them in the portable storage device.

17. The print shop system of claim 12, wherein the second print job management program includes program code configured to cause the second print job processing device to execute a print job importing process which includes:
(c) detecting the portable storage device connected to the second print job processing device;
(d) in response to a third command from an operator, wherein the third command indicates a selection of the first print job management program as an exporting program without indicating any storage location on the portable storage device, searching the first root directory on the portable storage device for stored print jobs, and displaying a list of print jobs found under the first root directory; and (e) in response to a fourth command from the operator which selects one or more print jobs from the displayed list, reading the selected print jobs from the portable storage device.

18. The print shop system of claim 17, wherein the print job importing process further includes, after step (c) and before step (d):

notifying the operator of the detection of the portable storage device; and in response to a fifth command from the operator, searching the portable storage device for all root directories corresponding to any print job management program of the print shop, and displaying a list of print job management programs whose root directories are found, wherein in step (d) the third command is a selection from the displayed list of print job management programs.

19. The print shop system of claim 18, wherein the print jobs are stored as exported print job groups under the first root directory, each print job group including print jobs that satisfy a plurality of criteria, wherein the criteria for each group is stored under the first root directory, and wherein step (d) includes displaying a list of all print job groups found under the first root directory along with the criteria for the print job groups.

20. The print shop system of claim 17, wherein the portable storage device further contains a configuration file under each root directory, the configuration file containing import instructions, and wherein the second print job management program reads the configuration file in the first root directory and performs one or more actions as instructed by the import instructions in the configuration file.

21. The print shop system of claim 20, wherein the import instructions include a backup instruction regarding automatic backup options after print jobs are imported.

22. The print shop system of claim 12, wherein the first print job management program further includes program code configured to cause the first print job processing device to execute a pre-configuration process which includes:

creating the first root directory and storing a configuration file in the first root directory, the configuration file containing export instructions to be executed by the first print job management program when exporting print jobs, and import instructions to be executed by any print job management program when importing print jobs from to the first root directory.

* * * * *